United States Patent
Collobert

(10) Patent No.: US 6,754,372 B1
(45) Date of Patent: Jun. 22, 2004

(54) METHOD FOR DETERMINING MOVEMENT OF OBJECTS IN A VIDEO IMAGE SEQUENCE

(75) Inventor: Michael Collobert, Pleumeur Bodou (FR)

(73) Assignee: France Telecom S.A., Paris (FR)

( * ) Notice: Subject to any disclaimer, the term of this patent is extended or adjusted under 35 U.S.C. 154(b) by 0 days.

(21) Appl. No.: 09/646,473

(22) PCT Filed: Mar. 19, 1999

(86) PCT No.: PCT/FR99/00634

§ 371 (c)(1),
(2), (4) Date: Nov. 30, 2000

(87) PCT Pub. No.: WO99/48048

PCT Pub. Date: Sep. 23, 1999

(30) Foreign Application Priority Data

Mar. 19, 1998 (FR) .......................................... 98 03641

(51) Int. Cl.$^7$ ................................................ G06K 9/00
(52) U.S. Cl. ..................................................... 382/107
(58) Field of Search .............................. 382/107, 173, 382/236, 251; 348/14.15, 27, 154, 155, 208.1, 700; 345/474; 375/240.03

(56) References Cited

U.S. PATENT DOCUMENTS

| | | | | |
|---|---|---|---|---|
| 5,764,803 A | * | 6/1998 | Jacquin et al. | ............... 382/236 |
| 6,188,776 B1 | * | 2/2001 | Covell et al. | ................ 382/100 |
| 6,188,798 B1 | * | 2/2001 | Lee | ............................ 382/251 |
| 6,229,854 B1 | * | 5/2001 | Kikuchi et al. | ......... 375/240.27 |

FOREIGN PATENT DOCUMENTS

WO     90/01706     2/1990     ........... G01S/3/786

OTHER PUBLICATIONS

W. Pratt, "Digital Image Processing", $2^{nd}$ Ed. 1991, pp. 597, 608–609.

* cited by examiner

*Primary Examiner*—Leo Boudreau
*Assistant Examiner*—Shervin Nakhjavan
(74) *Attorney, Agent, or Firm*—Lowe Hauptman Gilman & Berner, LLP

(57) ABSTRACT

The invention concerns a method for detecting the movement of objects which consists in computing the differences in each pixel of image signals into n-ary signals and carrying out a step of region growth and breaking it down.

17 Claims, 1 Drawing Sheet

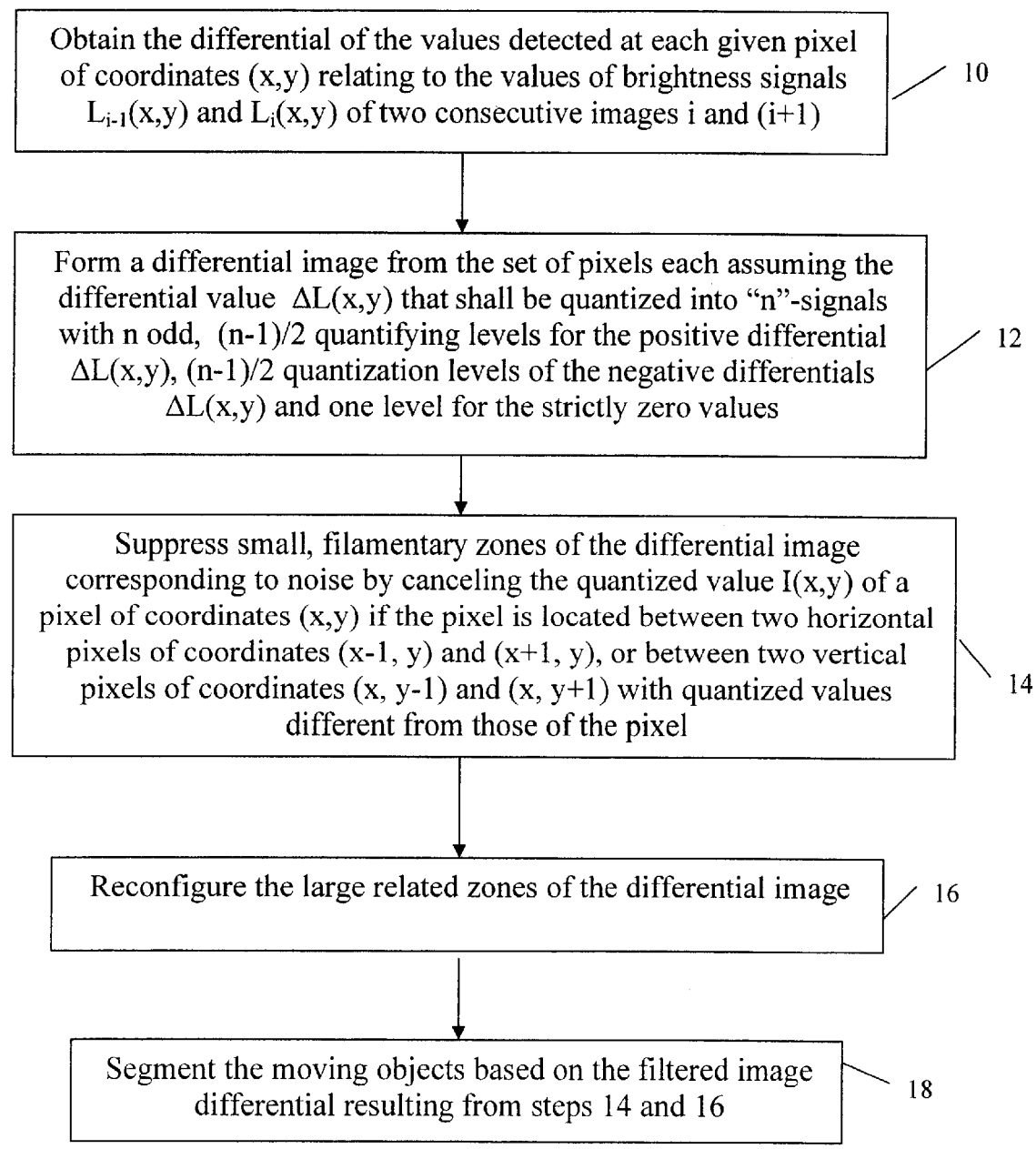

METHOD FOR DETERMINING MOVEMENT OF OBJECTS IN A VIDEO IMAGE SEQUENCE

The present invention relates to a method for detecting objection motion in a sequence of video images.

Such motion detecting methods already are known and illustratively are described in an article "Determining optical flow: a retrospective" by B K P Horn and B G Schunkin in ARTIFICIAL INTELLIGENCE (1993), pp 81–87 and in a book,"Video Coding" by L. Torres and Murant Kunt in KLUWER ACADEMIC PUBLISHERS. Illustratively the methods of the prior art are based on optical flux, matching blocks, contours etc.

These methods incur the drawback to demand much computational time and therefore are of little use when detecting moving objects in real time.

On the other hand a simpler and quicker method consists in calculating the differential image of each pixel between two consecutive images of the video sequence. This differential in general is calculated soled using the brightness information.

Accordingly, for each pixel's coordinates (x, y), the differential in the brightness signal of the images of order i and i+1 will be determined, namely $$\forall_i \Delta L(x,y) = L_{i-1}(x,y) - L_i(x,y)$$

where $L_{i-1}(x,y)$ and $L_i(x,y)$ resp. denote the brightness signal from the pixel of coordinates (x,y) of the images of orders i and i−1.

Due to the noise caused by the electronics and the camera pickups, in general a threshold will be introduced, whereby the differential signal is quantized as follows $$\forall x, \forall y \ I(x,y) = \text{when } \Delta L(x,y) < \text{threshold}$$

$$I(x,y) = 1 \text{ if } L(x,y) \geq \text{threshold}$$

where I(x,y) is quantized signal differential for the coordinates (x,y).

The value of a quantized signal associated with a pixel of coordinates (x,y) is a first value, here zero, if the brightness differential signal is less than a threshold value and will be a second value, here 1, if the differential signal is larger than said threshold value.

As regards a standard commercial camera, the applicable thresholds are about 5% of the possible excursion of the brightness values (typically, if the brightness varies between 0 and 255, the threshold will be about 12).

This procedure detects mainly the contours of the moving objects. It requires long calculation times to gain all the zones composing a moving object.

The patent document WO 90 01706 A also discloses an image processing method allowing acquiring objects with a stochastic background. In this method, each stage generates first and second image differentials which then are processed in a two-level threshold detector, said levels representing mean positive and negative noise and being fitted with coefficients. If the value of an image differential pixel exceeds the positive threshold value, said pixel is assigned a value of 1. If the value of a image differential pixel is less than the negative threshold value, a value of −1 is assigned to said pixel. When the pixel value is between the two threshold values, the assigned value is zero.

Using the above notation, one may then write $$\forall x, \forall y \ I(x,y) = 1 \text{ if}$$

$$I(x,y) = 1 \text{ if } \Delta L(x,y) > \text{threshold}$$

$$I(x,y) = 0 \text{ if } -\text{threshold} > \Delta L(x,y) > \text{threshold}$$

where I(x,y) is the quantized signal differential for the pixel of coordinates (x, y).

When using this method, and considering that the threshold levels depend on the noise, it is quite difficult, even impossible, to detect motion at values much below the camera noise. To resolve this problem, the said document uses lowpass filters for the image differential values.

Nevertheless, detection sensitivity is linked to the threshold being used to calculate the image differential and therefore it is at the level of the noise of the camera being used.

Accordingly it is the objective of the present invention to propose a method for motion detection which shall be free of the above cited drawbacks.

The sole figure is a flow diagram of steps performed by the method of the invention.

In a first implementation of the invention, as illustrated by the flow diagram of the figure, the method of the invention consists in obtaining the differential of the values detected at each given pixel of coordinates (x,y) relating to the values of brightness signals $L_{i-1}(x,y)$ and $L_i(x,y)$ of two consecutive images i and i+1 (step 10). Therefore the differential signal is $$\forall_i \Delta L(x,y) = L_{i-1}(x,y) - L_i(x,y)$$

where, as above, $L_i(x,y)$ and $L_{i-1}(x,y)$ resp. are the brightness signals from the pixel of coordinates (x,y) of the images of order i and i+1.

Be it borne in mind that any signal representing at least one image characteristic might be used. Illustratively the brightness signals may be replaced by chrominance-information signals. Also a particular combination of brightness and chrominance signals might be used.

A differential image is formed from the set of pixels each assuming the differential value ΔL(x,y) that shall be quantized into "n"-signals with n odd, (n−1)/2 quantifying levels for the positive differential ΔL(x,y), (n−1)/2 quantization levels of the negative differentials ΔL(x,y) and one level for the strictly zero values.

Illustratively, for n=3, the quantization takes place as follows:

$$\forall x, \forall y \ I(x,y) = 0, \text{ if } \Delta L(x,y) = 0$$

$$I(x,y) = 1 \text{ if } \Delta L(x,y) > 0$$

$$I(x,y) = -1 \text{ if } \Delta L(x,y) < 0.$$

The set of signals corresponding to the values I(x,y) for all pixels of image coordinates (x,y) are called herein the "image differential".

If an image differential is constructed in this manner and is displayed, there will appear, on one hand, large zones at the substantially positive or negative values I(x,y) and on the other hand there will appear checkerboard zones.

Each of the large ranges corresponds to a zone wherein the brightness gradient is roughly of constant direction. Statistically, in spite of the camera noise, such a zone shall be of a different positive or negative differential if the projection of the motion vector on the brightness gradient vector is other than zero.

The checkerboard zones of the remainder of the image show the noise from the pickup and the electronics.

In order to make use of this ternary differential, the small zones corresponding to noise must be suppressed (step 14) and the large related zones must be reconfigured (step 16).

By carefully examining the checkerboard zones corresponding to the noise, it is noted that they are locally correlated with their neighbors, thereby generating "filamentary" zones. This may lead to phenomena which in the technology are called premature "seepages" over the full image when using region growth algorithms.

To avert such seepages, the invention proposes using a filtering stage (in step 14) which must be applied to this differential image to suppress said "filamentary" zones.

Illustratively this filtering stage (included in step 14) consists in canceling the quantized value I(x,y) of a pixel of coordinates (x,y) if it is located between two horizontal pixels of coordinates (x−1, y) and (x+1, y), or between two vertical pixels of coordinates (x, y−1) and (x, y+1) with quantized values different from its own.

Based on this filtered image differential resulting from steps 14 and 16, region-growth stage is initiated to segment the moving objects (step 18). Illustratively, step 18 is performed in accordance with the method described in the book "Visions par Ordinateurs" [Computer Sight], Hermes publishers, R, Horand and O. Monga.

A particular implementation of such segmentation can be carried out for instance using a relationship of order 4 per aggregate of pixels in the state 1 or −1. To suppress the small noise-caused regions, it is possible (in step 14) either to set a priori a threshold on the size of the objects being looked for, or, if the object comprises contours, to constrain that at least one of its constituent pixels shall be—in the image differential—of a value larger than a fixed threshold above the noise.

The method of the invention offers much more pertinent segmentation than does the conventional differential method of the state of the art: Instead of solely determining the contours, it is the set of zones composing a moving object which is easily detected. As regards computing time, only one simple additional filtering stage is required, entailing little cost.

The present invention applies to many fields. Illustratively and without implying limitation, it applies to man-machine interfaces, coding and compressing images, robotics, TV. It may be applied to artificial retinas, "hard" wiring into cameras or monitors, in fluid flow (turbulence, meteorology) and intrusion surveillance and smoke detection.

What is claimed is:

1. A method to detect the motion of objects in a sequence of video images, said method consisting in determining the value differentials respectively detected at each pixel in the form of signals representing a characteristic of said images for two consecutive images in order to generate a signal differential which then is quantized into "n" signals, where n is odd, characterized in that
said method makes use of (n−1)/2 quantizing levels for the positive value differentials, of (n−1)/2 quantization levels for the negative value differentials and one level for the rigorously zero value differentials, and then implements a region-growth stage and in this manner segmentizes the moving objects.

2. Method as claimed in claim 1, characterized in that the differential signal is quantized into ternary signals, into a level for the positive values of the differential signals, a level for the negative values of the differential signals and a value level for the differential signal being strictly zero.

3. Method as claimed in claim 1, characterized in that prior to the stage of region growth, the set of pixels assuming respectively said quantized differential values is processed in a filtering stage in order to eliminate from it its filamentary zones.

4. Method as claimed in claim 3, characterized in that said filtering stage consists in canceling the quantized value of a pixel if said pixel is situated between two horizontal or vertical pixels of other quantized values than its own.

5. Method as claimed claim 1, characterized in that said signals representing a characteristic of said images are brightness signals.

6. Method as claimed claim 1, characterized in that said signals representing a characteristic of said images are chrominance signals.

7. Method as claimed in claim 1, characterized in that said signals representing a characteristic of said signals are signals resulting from the combination of the brightness and chrominance signals.

8. Method as claimed in claim 2, characterized in that prior to the stage of region growth, the set of pixels assuming respectively said quantized differential values is processed in a filtering stage in order to eliminate from it its filamentary zones.

9. Method as claimed in claim 2, characterized in that said signals representing a characteristic of said images are brightness signals.

10. Method as claimed in claim 3, characterized in that said signals representing a characteristic of said images are brightness signals.

11. Method as claimed in claim 4, characterized in that said signals representing a characteristic of said images are brightness signals.

12. Method as claimed in claim 2, characterized in that said signals representing a characteristic of said images are chrominance signals.

13. Method as claimed in claim 3, characterized in that said signals representing a characteristic of said images are chrominance signals.

14. Method as claimed in claim 4, characterized in that said signals representing a characteristic of said images are chrominance signals.

15. Method as claimed in claims 2, characterized in that said signals representing a characteristic of said signals are signals resulting from the combination of the brightness and chrominance signals.

16. Method as claimed in claims 3, characterized in that said signals representing a characteristic of said signals are signals resulting from the combination of the brightness and chrominance signals.

17. Method as claimed in claims 4, characterized in that said signals representing a characteristic of said signals are signals resulting from the combination of the brightness and chrominance signals.

* * * * *